United States Patent [19]

Brackett et al.

[11] Patent Number: 4,781,656

[45] Date of Patent: Nov. 1, 1988

[54] VARIABLE SPEED POWER TRANSMISSION PULLEY AND SYSTEM

[75] Inventors: George E. Brackett, Bonita Springs; Thomas A. Murphy, Marco Island, both of Fla.

[73] Assignee: Maxaxam Corporation, Dover, Del.

[21] Appl. No.: 64,087

[22] Filed: Jun. 18, 1987

[51] Int. Cl.⁴ .............................................. F16H 9/20
[52] U.S. Cl. ....................................... 474/29; 474/39
[58] Field of Search ................... 474/29, 31, 39, 41, 474/47-56

[56] References Cited

U.S. PATENT DOCUMENTS

| | | | |
|---|---|---|---|
| 644,702 | 3/1900 | Brooks | 474/31 |
| 703,359 | 6/1902 | White | 474/83 |
| 704,203 | 7/1902 | Moorhouse | 474/83 |
| 1,350,670 | 8/1920 | Ritter | 474/29 |
| 1,664,349 | 3/1928 | Burrow | 474/29 |
| 2,078,196 | 4/1937 | Heyer | 474/39 |
| 2,233,822 | 3/1941 | Schübbe | 474/39 |
| 2,548,316 | 4/1951 | Locke | 474/39 |
| 3,177,733 | 4/1965 | Yamano | 474/95 X |
| 3,981,205 | 9/1976 | Avramadis et al. | 474/39 |

FOREIGN PATENT DOCUMENTS

70374  4/1946  Norway .

Primary Examiner—Thuy M. Bui
Attorney, Agent, or Firm—Lerner, David, Littenberg, Krumholz & Mentlik

[57] ABSTRACT

A variable speed power transmission pulley and system are disclosed. The system includes a pair of spaced shafts each having a pulley keyed thereto, the effective diameter of which is adjustable. A flat band belt is entrained about annular elastomeric members carried on the surfaces of the pulleys to drivingly interconnect the pulleys. Each pulley includes a pair of slotted, interengaging conical pulley sections and the effective outer diameter of the pulley is variable by moving the conical sections axially toward or away from one another.

20 Claims, 6 Drawing Sheets

VARIABLE SPEED POWER TRANSMISSION PULLEY AND SYSTEM

FIELD OF THE INVENTION

The present invention relates to variable speed power transmission pulleys and systems and, more particularly, to the use of such pulleys in conjunction with relatively thin flat belts, such as steel bands, in such systems.

BACKGROUND OF THE INVENTION

Variable speed power transmission systems are commonly used in automotive and other applications in which accessories are driven from an engine by drive pulleys and a drive belt which is received on a driven pulley that is connected to the accessory. The conventional variable speed power transmission system allows the speed of the accessory being driven by the engine to be maintained more nearly constant notwithstanding that engine speed may be varied considerably during driving.

The variable speed power transmission systems commonly used in the past employ a pair of spaced, adjustable pulleys interconnected by V-belt arrangements in which the side edges of the V-belt, which generally form an included angle of 30°, cooperate with opposed side surfaces of pulleys that also form an included angle of 30° between them and are relatively axially moveable toward or away from one another. Such movement of the pulley side surfaces toward or away from one another changes the effective diameter at which the V-belt rides on the pulley sides, thereby changing the speed relationship between the two pulleys, and the speed ratio between the driving engine and the driven accessory.

The foregoing systems, while satisfactory for purposes of driving accessories from an automotive engine, are limited in application due to the facts that they employ elastomeric V-belts as the load carrying members that extend between the driving pulley and the driven pulley, and that the power carrying capacity of conventional elastomeric V-belts is relatively low unless the belts are made prohibitively large in size. This limitation has become more pronounced and evident in recent years with the tendency for automative engines to be made smaller and to operate at higher load ratings, and has become particularly apparent in connection with the use of small engines which create maximum torque at and are operated at relatively high engine speeds. Rather than speeding up and slowing down the engines to effect speed changes of the vehicles, in these engines variable speed power transmissions can be employed to effect the necessary speed changes of the vehicle. These drive systems, termed constant velocity transmission drive systems, place large strains on conventional variable speed power transmission systems and lead to early failure of V-belts employed in such conventional variable speed power transmission systems when they are used in constant velocity transmission drive systems.

It is, therefore, a primary object of the present invention to provide an improved variable speed power transmission system which overcomes the deficiencies of prior forms of variable speed power transmission systems.

Another object of the present invention is to provide an improved power transmission pulley for use in an improved variable speed power transmission system.

A further object of the invention is to provide an improved power transmission pulley for use in an improved power transmission system and in which system a flat metallic belt may be substituted in place of the conventional V-belt as the driving belt of the variable power transmission system.

Additional objects and advantages of this invention will become apparent as the following description proceeds.

SUMMARY OF THE INVENTION

Briefly stated, and in accordance with one embodiment of this invention, an improved variable speed power transmission system comprises a pair of spaced shafts each having an adjustable pulley keyed thereto, the pulleys being formed by a pair of interengaging generally conical slotted pulley sections positioned so that changes in relative axial adjustment of the sections produce corresponding variations in effective pulley diameter. The pulleys carry annular elastomeric members having conical inner surfaces therein, corresponding to the conical pulley sections, and having a generally cylindrical outer surface thereon, whereby variations in the effective diameters of the pulleys produce corresponding variations in the diameters of the cylindrical outer surfaces on the annular members. A flat belt member of metal or other high tensile flexible material is entrained about the outer surfaces of the annular elastomeric members to drivingly interconnect the power transmission pulleys.

BRIEF DESCRIPTIONS OF THE DRAWINGS

While the specification concludes with claims particularly pointing out and distinctly claiming the subject matter regarded as the invention herein it is believed that the present invention will be more readily understood from the following description, taken in conjunction with the accompanying drawings, in which:

Referrring to FIGS. 1-6, a representative, simplified, variable speed power transmission system has been illustrated generally at 1. The system 1 includes a rotary power source 2, for example an engine or a motor, the output shaft 3 of which rotatively carries therewith an adjustable power transmission drive pulley 4 in accordance with this invention. The pulley 4 drives a driven adjustable power transmission pulley 5 via a flat band type belt 6 that is entrained about the two pulleys. Driven pulley 5 is mounted upon and keyed to a driven output shaft 7 that drives a utilization device 8, for example a drive wheel or a blower or a pump, the speed of which must be varied or controllable.

Figure 1:
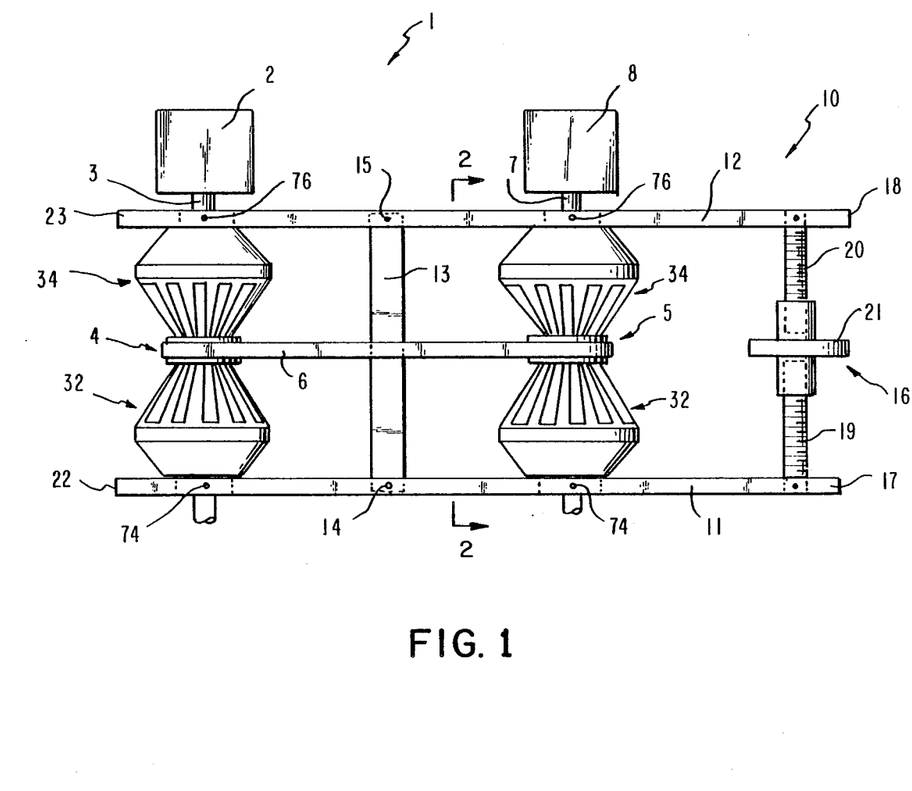
FIG. 1 is a plan view of a variable speed power transmission system in accordance with one embodiment of this invention.

Drive shafts 3 and 7 and their respective pulleys 4 and 5 are rotatably and axially adjustably carried by a pulley support and adjusting mechanism, shown generally at 10, which includes first and second side frame members 11 and 12, and a cross member 13 on which the side frame members 11 and 12 are pivoted at 14 and 15, respectively. The pulley support and adjusting mechanism 10 further includes an end adjusting means, shown generally at 16, for moving the ends 17 and 18 of respective side frames 11 and 12 towards or away from one another in order to effect changes in the speed ratio of the driving and driven pulleys 4 and 5, as will be further described hereinafter. The end adjusting means 16 may, for example, comprise a turnbuckle arrangement including threaded rods 19, 20 which enter opposite ends of an internally threaded turnbuckle screw member 21. The threads on the rods 19 and 20 are of opposite hand to one another, as are the internal threads in the turnbuckle screw member 21, so that rotation of the turnbuckle screw member 21 in one direction causes the ends 17 and 18 of the side frame members to move toward one another, and rotation of the turnbuckle screw member 21 in the opposite direction causes the ends 17 and 18 of the side frame members to move away from one another. When the ends 17 and 18 move toward one another, the opposite ends 22 and 23 of the side frame members 11 and 12, respectively, move away from one another and, when the ends 17 and 18 move away from one another, the opposite ends 22 and 23 of the side frame members move toward one another, by virtue of the side frame members 11 and 12 being pivoted at pivots 14 and 15.

Referring more particularly to FIGS. 2-6, each of the adjustable power transmission pulleys 4 and 5 includes first and second generally conical pulley sections, shown generally at 32 and 34, respectively, having respective base portions 36 and 38, apex portions 40 and 42 and generally conical outer surfaces 44 and 46. The conical outer surface 44 of pulley section 32 is comprised of a plurality of circumferentially spaced, axially and radially extending segments, identified generally at 48 and individually at 48A-48L. The segments 48A-48L may be integral with or otherwise supported from base portion 36 of the pulley section 32. The segments 48A-48L are separated by circumferentially spaced, axially and radially extending corresponding slots, identified generally at 50 and individually at 50A-50L.

Figure 2:
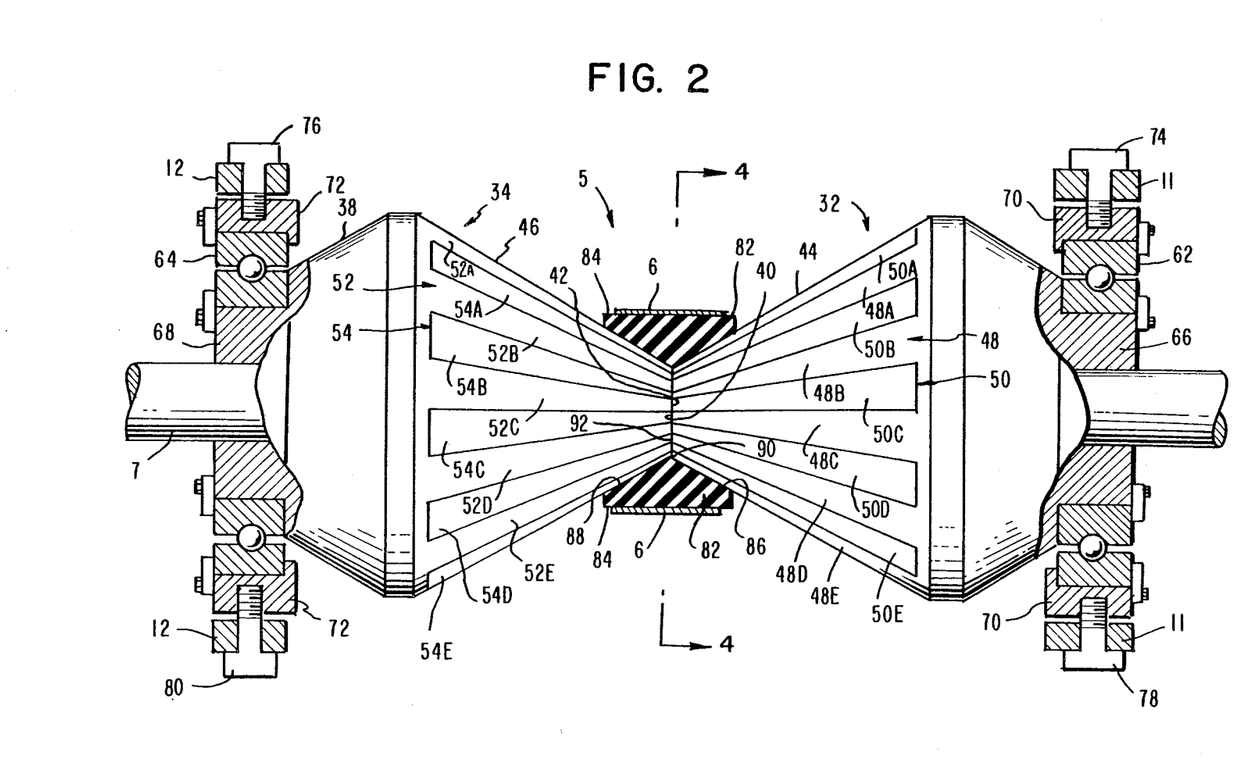
FIG. 2 is an enlarged sectional elevation view, taken along the line 2—2 of FIG. 1, showing an improved pulley in accordance with this invention, with the pulley being in one condition of operation.
Figure 3:
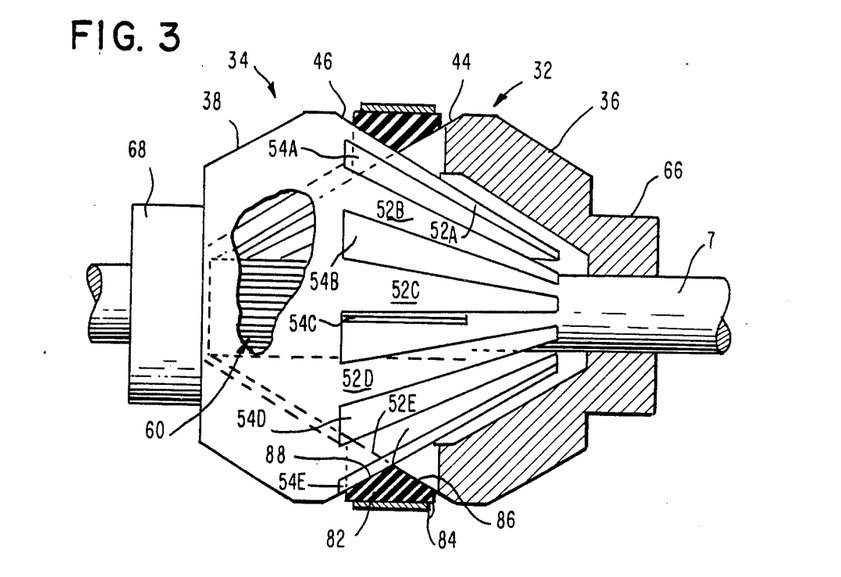
FIG. 3 is a view similar to FIG. 2, showing the pulley thereof being in another condition of operation.
Figure 4:
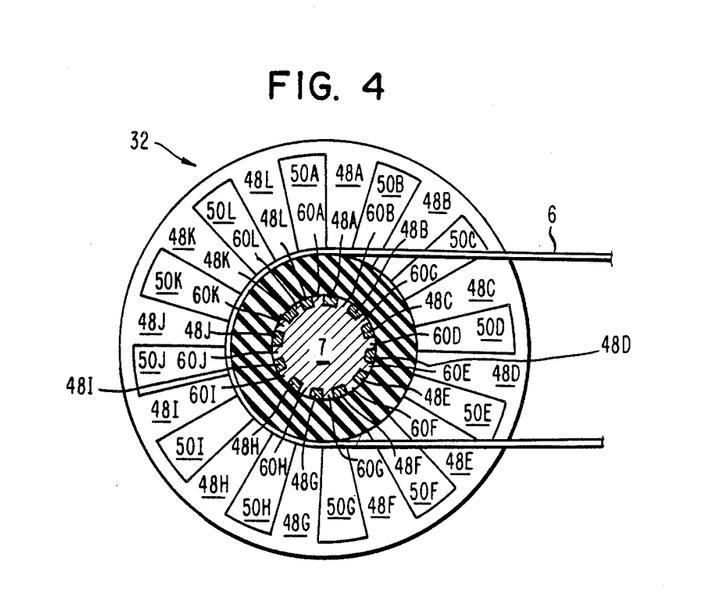
FIG. 4 is a sectional elevation view, taken along the line 4—4 of FIG. 2.

The conical outer surface 46 of pulley section 34 is also comprised of a plurality of circumferentially spaced, axially and radially extending segments, shown generally at 52 and individually at 52A-52L, which segments are separated by corresponding circumferentially spaced axially and radially extending slots, shown generally at 54 and individually at 54A-54L. The segments 52A-52L may be integral with or otherwise supported by the base portion 38 of pulley section 34, and project toward the apex portion 42 thereof. The segments 52A-52L of pulley section 34 project into the slots 50A-50L of pulley section 32, and the segments 48A-48L of pulley section 32 project into the slots 54A-54L of pulley section 34, so that the segments and slots of the pulley sections interengage or intermesh with each other, allowing the pulley sections of each pulley to be axially adjusted relative to one another to change the effective minimal outer diameter of the pulley with such adjustment.

Figure 5:
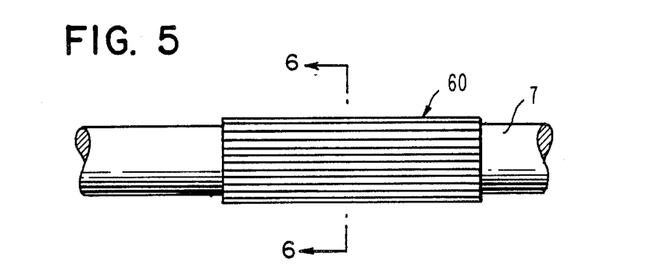
FIG. 5 is side elevation view of a pulley support shaft used in this invention, showing the fluting employed thereon.
Figure 6:
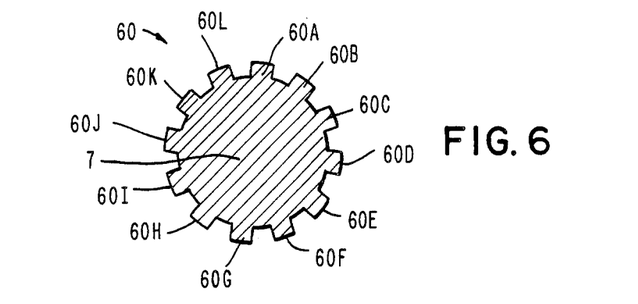
FIG. 6 is a sectional elevation view, taken along the line 6—6 of FIG. 5.

As shown most clearly in FIGS. 4-6, each of the shafts 3, 7 is provided with a fluted outer portion, shown generally at 60, which includes a plurality of raised ribs or flutes 60A-60L therein. The flutes 60A-60L engage with the radially inner portions of the segments 48A-48L so that splined connections are made between the pulley sections 32 and the shafts 3, 7, allowing the pulley sections to be axially moved on the shafts but requiring the pulley sections to rotate with the shafts. The internal diameters of the conical portions of pulley sections 34 are slightly greater than the external diameters of the fluted portions 60 of shafts 3 and 7 so that such conical portions can move axially freely on such fluted portions. The pulley sections 34 are also indirectly splined to the shafts 3, 7 due to the fact that their segments 52A-52L interengage with and are driven by the segments 48A-48L of pulley section 32, which are splined to shafts 3, 7.

Referring to FIG. 2, pulley sections 32 and 34 are supported in the respective side frame members 11 and 12 by bearings 62 and 64, respectively. The inner races of bearings 62 and 64 are clamped to and carried by hub portions 66 and 68 on the respective pulley sections 32 and 34. The outer races of the bearings 62 and 64 are clamped to and carried by respective collars 70 and 72 that are pivotally supported in the respective side frame members 11 and 12 by respective upper bolt type pivot pins 74 and 76 and respective lower bolt type pivot pins 78 and 80, so that movement of the side frame members 11 and 12 toward or away from one another results in corresponding axial movement of the pulley sections 32 and 34 toward and away from one another.

Pulleys 4 and 5 are each provided with an annular elastomeric member 82 having a cylindrical outer surface 84 that serves to support the drive belt 6 which is entrained about each pulley. The elastomeric member 82 is also provided with generally conical inner surfaces 86 and 88 which intersect at the center line of the member at a position 90 of minimum internal diameter that corresponds to a position 92 of minimum external diameter at the intersection of the conical surfaces 44 and 46 of pulleys 4 and 5.

The conical inner surfaces 86 and 88 make an angle with the axis thereof that is similar to the angle made by the conical outer surfaces 44 and 46 with their axis. In the preferred embodiment of this invention the angles formed by these conical surfaces and their axes is preferably about 30°; however, depending on the speed variation capability that the adjustable power transmission system is desired to have, the angles formed by the conical surfaces and their axes can vary from about 5° to about 60° without departing from the broader aspects of this invention.

The annular elastomeric member 82 is preferably molded in the form shown in FIGS. 2 and 4 with its minimum internal diameter 90 at, or slightly less than, the minimum external diameter 92 of the pulleys 4 and 5, which occurs when the pulley sections 32 and 34 are separated by the maximum amount at which they are designed to be separated. This allows the annular elastomeric member 82 to fit snugly in its position between the pulley sections 32 and 34 and when the pulley sections 32 and 34 are moved towards one another to their position of maximum approach, as shown in FIG. 3, the elastomeric annular member is correspondingly stretched so as to change the effective diameter at which the belt 6 rides on the elastomeric member 82. This, coupled with a corresponding change in the other pulley about which belt 6 is entrained, causes the speed relationship between the two pulleys to be correspondingly varied.

Figures 7A, 7B, 7C:
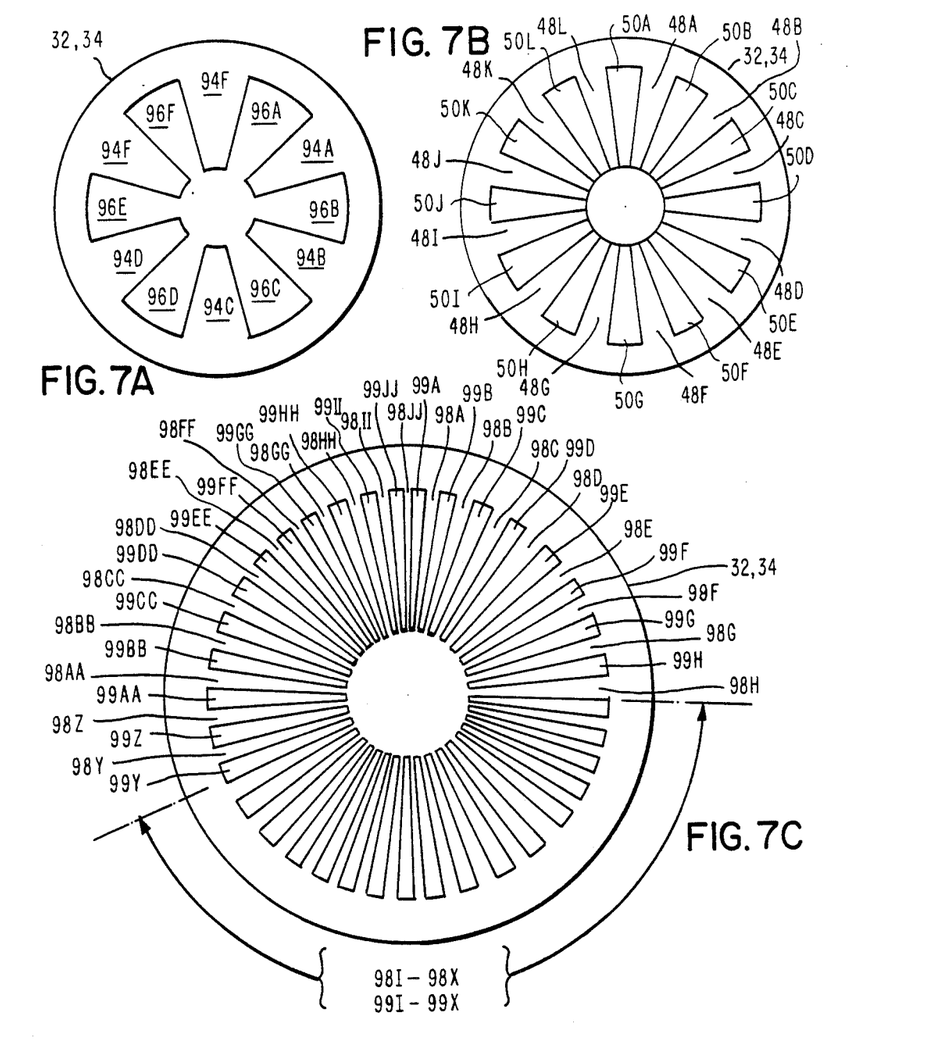
FIGS. 7A–7C are end elevation views of various alternative segment and slot arrangements that may be utilized in connection with the pulleys of this invention.

As shown most clearly in FIGS. 4 and 7B, in the preferred embodiment of the invention each of the pulley sections 32, 34 is provided with 12 segments 48A–48L having equal cross-sectional angular circumferential extents of about 15°, and is provided with 12 slots 50A–50L, each of which has a cross-sectional angular circumferential extent of about 15°.

Referring now to FIG. 7A, an embodiment of the invention is shown wherein each of the pulley sections is provided with six segments 94A–94F, each of which has a cross-sectional angular circumferential extent of about 30°, and is provided with six slots 96A–96F, each of which has a cross-sectional angular circumferential extent of about 30°. This embodiment, although easier to manufacture because it provides greater spacing between adjacent segments, allows more room for the elastomeric material to take a chordal path, or to tend to flatten out, between the adjacent segments when it is stretched as the pulley sections 32, 34 move toward their positions of closest approach.

In order to avoid excessive flat-spotting on the cylindrical outer surface 84 of the elastomeric member 82 under these conditions, it is has been found desirable to grind the outer cylindrical surface so that it is round when the pulley sections 32, 34 are at the mid-point of their potential range of spacing from one another, thus minimizing the amount of out of round or chordal flattening that occurs when the pulley sections are at their positions either of nearest approach or furthest separation. Alternatively, small aberrations can be molded into the outer surface of the elastomeric member 82 so that the chordal effect is minimal when the pulley sections 32, 34 are at the mid-point of their approach to one another and so that the amount of out of round when they are at their closest point of approach and furthest point of approach is not sufficient to significantly alter the driving capability of the pulley relative to the belt 6. As the number of segments and slots on the pulleys 32, 34 is reduced below six of each, the chordal effect tends to worsen and, therefore, as a practical limit it is preferred to have at least six such segments and slots on each pulley section.

The number of segments and slots can, of course, be increased significantly from the preferred 12 segments and 12 slots shown in FIG. 7B to a number limited only by the practical matter of manufacturing the pulley section with a great number of segments and slots. A pulley section 32, 34 having 36 segments and 36 slots has been illustrated in FIG. 7C. In this case each of the segments has a cross-sectional angular circumferential extent of about 5°, and each of the slots has a cross-sectional angular circumferential extent of about 5°. The closer spacing of the segments to one another in this embodiment minimizes the chordal effect referred to in connection with the FIG. 7A embodiment and provides a smoother transfer of power from the driving pulley to belt 6 and from belt 6 to the driven pulley. The practical upper limit on the number of segments and slots that may be employed on the pulley sections 32, 34 occurs when the segments have a cross-sectional angular circumferential extent of about $1\frac{1}{2}°$ and the slots also have a cross-sectional angular circumferential extent of about $1\frac{1}{2}°$. In this case the segments have a thickness that would be similar to that which is found in transformer laminations. They would be bonded, crimped or otherwise fastened to the base portions 36, 38 of the pulley sections 32, 34 during manufacture.

Figure 8A:
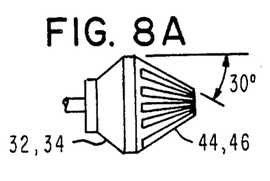
FIGS. 8A–8C are side elevation views of various alternative cone angles that may be utilized in connection with the pulleys of this invention.
Figure 8B:
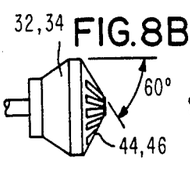
Figure 8C:
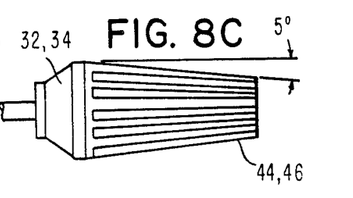

Referring now to FIGS. 8A–8C, the conical surfaces 44, 46 of the pulley sections 32, 34 may form angles with the axes of such sections which vary anywhere from about 5°, as shown in FIG. 8C, to about 60°, as shown in FIG. 8B, but preferably is about 30°, as shown in FIG. 8A. A 5° angle between the conical outer surface and the axis thereof would be employed where only small speed variations are required between the driving and driven pulleys, whereas the large 60° angle might be used where large speed variations may be needed during the operation of the system. Angles of greater than 60° would tend to compress the conical surfaces 86, 88 (FIG. 2) of the elastomeric member towards one another, rather than expand the outer cylindrical surface 84 thereof outwardly, leading to potentially early failure of the elastomeric member as the edges of the segments tend to cut into the elastomeric member. Angles below 5° of conicity of the outer conical surfaces relative to their axis would not give enough of a diameter variation between the driving and driven pulleys to warrant their use.

Figure 9:
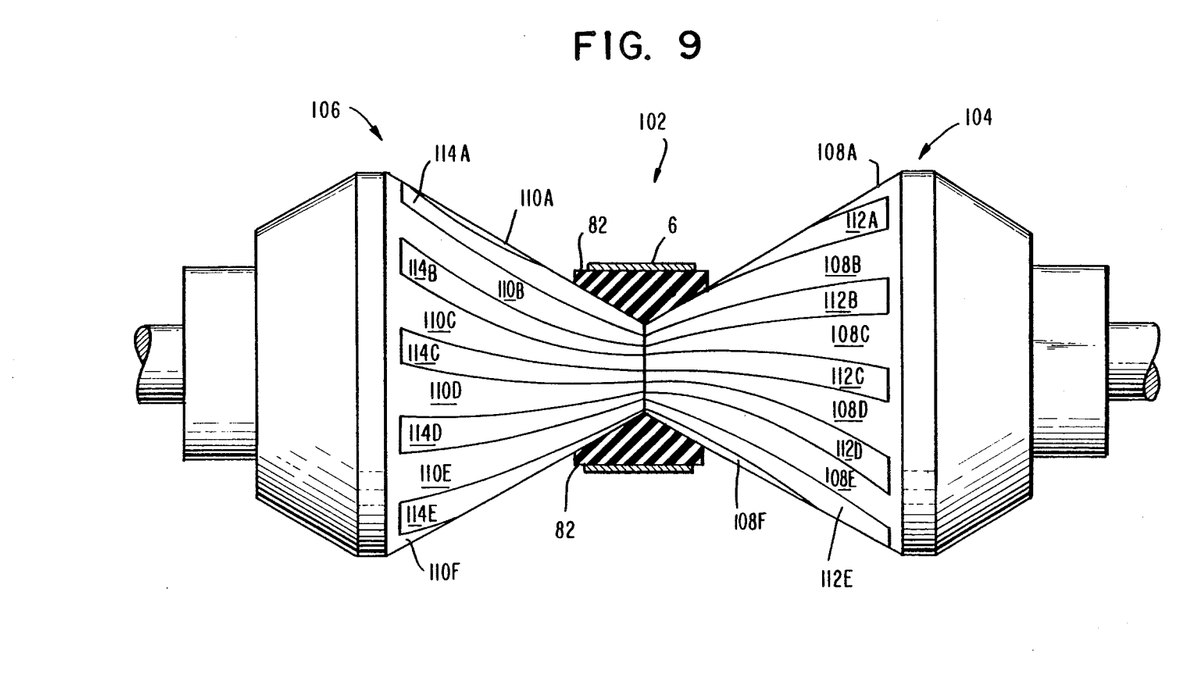
FIG. 9 is a side elevation view of a pulley made in accordance with an alternate embodiment of this invention.

Referring now to FIG. 9, a pulley 102 made in accordance with an alternate embodiment of this invention has there been illustrated. The pulley 102 includes pulley sections 104 and 106 that are provided with respective helically oriented segments 108A–108L and 110A–110L, and helically oriented slots 112A–112L and 114A–114L. The pulley sections 104 and 106 are moved toward one another or separated from one another by imparting to them a combined axial and rotational movement so that, in effect, they are threaded into engagement with one another during movement toward and away from one another.

Figure 10:
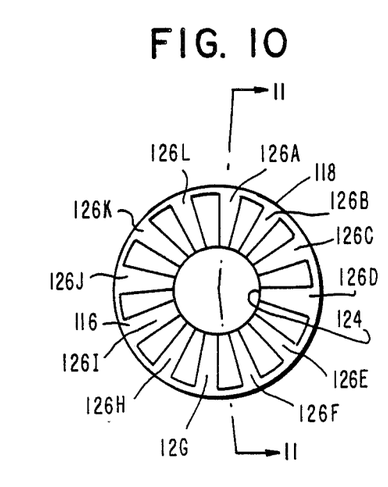
FIG. 10 is a side elevation view of an alternate form of annular elastomeric member that may be used on the pulley of this invention.
Figure 11:
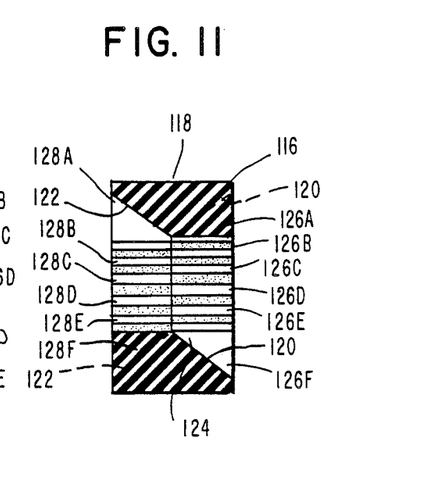
FIG. 11 is a sectional elevation view, taken along the line 11—11 of FIG. 10.

Referring now to FIGS. 10 and 11, an alternate form of annular elastomeric member 116 has there been illustrated. The elastomeric member 116 includes a generally cylindrical outer surface 118 and generally conical inner surfaces 120 and 122. The inner surfaces 120 and 122 intersect at the center line 124 of the elastomeric member, which position is also the position of minimum internal diameter of the elastomeric member. The conical surfaces 120 and 122 are each provided with respective sets of radially inwardly extending lugs or protrusions 126A–126L and 128A–128L. The protrusions 126A–126L and 128A–128L extend into the slots 50A–50L (FIGS. 4 and 7B) and 54A–54L (FIG. 2), respectively, and assist in keying the elastomeric member 116 to the pulley sections 32, 34 to insure that the elastomeric member 116 rotates in unison with the pulley sections 32, 34. The protrusions and lugs 126A–126L and 128A–128L are, of course, circumferentialy spaced from one another by the same angular extent as are the slots in the pulley sections, and are offset with respect to one another so that they will each engage in their corresponding series of slots on the corresponding pulley sections.

From the foregoing discussion, it can be seen that the present invention provides an improved variable speed power transmission system, employing improved pulleys therein which operate in conjunction with a flat metallic or other high tensile strength belt capable of transmitting high torque loads between a driving and driven pulley. The pulleys and the other components of the system are reliable, easy to manufacture and precisely controllable, allowing such variable speed power transmission systems and pulleys to be used in a greater variety of applications than heretofore has been the case.

While there have been shown and described what are presently considered to be the preferred embodiments of this invention, it will be obvious to those skilled in the art that various changes and modifications may be made without departing from the broader aspects of this invention. It is, therefore, aimed in the appended claims to cover all such changes and modifications as fall within the true spirit and scope of this invention.

What is claimed is:

1. An adjustable power transmission pulley, comprising a pair of generally conical pulley sections, each of said sections having a base portion, an apex portion and a generally conical outer surface thereon formed by a plurality of generally axially extending, circumferentially spaced, segments which project from said base portion toward said apex portion, the segments of one of said sections inter-engaging with the segments of the other of said sections to form a support surface therebetween, the minimum diameter of said support surface being variable by axially relatively moving said sections toward or away from one another, between positions of maximum approach and maximum separation; and, an annular elastomeric member mounted on said support surface, said elastomeric member having generally conical internal surfaces thereon which correspond to the conical outer surfaces of said sections and having a generally cylindrical outer surface thereon, said conical internal surfaces of said elastomeric member having a minimum internal diameter, when unstretched, that is no greater than the minimum external diameter of said support surface when said pulley sections are at their positions of maximum separation from one another.

2. A pulley according to claim 1, wherein said conical outer surface of said pulley section forms an angle with the axis of said section of from about 5° to about 60°.

3. A pulley according to claim 1, wherein said conical outer surface of said pulley section forms an angle with the axis of said section of about 30°.

4. A pulley according to claim 1, wherein each of said segments has a cross-sectional angular circumferential extent of from about 1.5° to about 30°.

5. A pulley according to claim 1, wherein each of said segments has a cross-sectional angular circumferential extent of about 15°.

6. A pulley according to any one of claims 1–5, wherein said internal conical surfaces of said elastomeric member are provided with a plurality of radially inwardly projecting, integral lug portions which extend between said segments of said pulley sections and rotationally key said elastomeric member to said pulley sections.

7. A pulley according to claims 4 or 5, wherein each of said segments is spaced from its next adjacent segments by gaps having cross-sectional angular circumferential extents about equal to the cross-sectional angular circumferential extents of said segments.

8. A pulley according to any one of claims 1–5, wherein said segments project helically from said base portions toward said apex portions of said pulley sections.

9. A variable speed power transmission system, comprising a pair of shafts; an adjustable pulley mounted on each of said shafts and keyed thereto for rotation therewith, each of said pulleys including a pair of inter-engaging, slotted pulley sections having generally conical surfaces and being constructed and arranged so that changes in relative axial adjustment of said sections produce corresponding variations in effective pulley diameter between a minimum effective pulley diameter and a maximum effective pulley diameter; an annular elastomeric member mounted on each of said pulleys, said elastomeric members each having generally conical internal surfaces which correspond to and seat upon the conical surfaces of said pulley sections, said elastomeric members each having a generally cylindrical outer surface, the variations in effective diameters of said pulleys producing corresponding variations in the diameters of the cylindrical outer surfaces of said elastomeric annular members; and, a belt member entrained about the outer surfaces of said annular elastomeric members for drivingly interconnecting said pulleys.

10. A variable speed power transmission system according to claim 9, wherein said conical outer surface of each of said pulley sections forms an angle with the axis of said section of from about 5° to about 60°.

11. A variable speed power transmission system according to claim 10, wherein said conical outer surface of each of said pulley sections forms an angle with the axis of said section of about 30°.

12. A variable speed power transmission system according to claim 9, wherein each of said slotted pulley sections includes a base portion and an apex portion, wherein said conical outer surface is formed by a plurality of generally axially extending, circumferentially spaced segments which project from said base portion toward said apex portion, wherein the segments of one of said sections inter-engage with the segments of the other of said sections, and wherein each of said segments has a crosssectional angular circumferential extent of from about 1.5° to about 30°.

13. A variable speed power transmission system according to claim 12, wherein each of said segments has a cross-sectional angular circumferential extent of about 15°.

14. A variable speed power transmission system according to claim 9, wherein said belt member comprises a flat metallic endless band.

15. A variable speed power transmission system according to any one of claims 9–14, wherein said internal conical surfaces of said elastomeric members are provided with a plurality of radially inwardly projecting, integral lug portions which extend into the slots of said pulley sections and rotationally key said elastomeric members to said pulley sections.

16. A variable speed power transmission system according to any one of claims 12–14, wherein the slots separating said segments on each of said pulley sections have cross-sectional angular circumferential extents that are about equal to the cross-sectional angular circumferential extents of said segments.

17. A variable speed power transmission system according to any one of claims 9-14, further including first means coupled to at least one of said pulley sections on at least one of said shafts for relatively axially adjusting said one pulley section to the other of said pulley sections on said shaft.

18. A variable speed power transmission system according to claim 17, further including second means coupled to at least one of said pulley sections on the other of said shafts for relatively axially adjusting said one pulley section to the other of said pulley sections on said shaft.

19. A variable speed power transmission system according to claim 18, wherein said first and second pulley section moving means are so interrelated with one another that axial relative movement of pulley sections on one shaft toward one another is accompanied by axial relative movement of pulley sections on the other of said shafts away from one another.

20. A variable speed power transmission system according to any one of claims 9-14, wherein said segments project helically from said base portions toward said apex portions of said pulley sections.

* * * * *